US012745142B2

(12) United States Patent
Hong

(10) Patent No.: US 12,745,142 B2
(45) Date of Patent: Sep. 22, 2026

(54) SYSTEM AND METHOD FOR WIRELESS CHARGING CAPABILITY DETERMINATION AND INDICATION

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 342 days.

(21) Appl. No.: 18/283,722

(22) PCT Filed: Mar. 26, 2021

(86) PCT No.: PCT/CN2021/083426
§ 371 (c)(1),
(2) Date: Sep. 22, 2023

(87) PCT Pub. No.: WO2022/198678
PCT Pub. Date: Sep. 29, 2022

(65) Prior Publication Data

US 2024/0172065 A1 May 23, 2024

(51) Int. Cl.
*H04W 36/00* (2009.01)
*H04W 36/08* (2009.01)
*H04W 36/30* (2009.01)

(52) U.S. Cl.
CPC ... *H04W 36/008357* (2023.05); *H04W 36/08* (2013.01); *H04W 36/304* (2023.05)

(58) Field of Classification Search
CPC .. H02J 50/10; H02J 50/20; H02J 50/23; H02J 50/27; H02J 50/80; H02J 50/40; H02J 50/402; H04W 36/008357; H04W 36/08; H04W 48/12; H04W 48/20; H04W 36/304; H04W 48/16
See application file for complete search history.

(56) References Cited

U.S. PATENT DOCUMENTS

| | | | | |
|---|---|---|---|---|
| 9,332,134 B2 * | 5/2016 | Wänstedt | | G06Q 20/145 |
| 2012/0231856 A1 * | 9/2012 | Lee | | H02J 50/40 455/573 |
| 2013/0278206 A1 * | 10/2013 | Won | | H02J 50/12 320/108 |
| 2013/0288600 A1 | 10/2013 | Kuusilinna et al. | | |

(Continued)

FOREIGN PATENT DOCUMENTS

| | | |
|---|---|---|
| CN | 104365146 A | 2/2015 |
| WO | WO 2017183815 A1 | 10/2017 |

OTHER PUBLICATIONS

European Patent Application No. 21932297.1 Search Report dated Dec. 13, 2024, 13 pages.

(Continued)

*Primary Examiner* — Allahyar Kasraian
(74) *Attorney, Agent, or Firm* — Cozen O'Connor

(57) ABSTRACT

A capability determination method and device, and a capability indication method and device. A base station sends capability information to a terminal. The capability information is configured to indicate a wireless charging capability of the base station. The terminal receives the capability information sent by the base station, and determines the wireless charging capability of the base station according to the capability information.

20 Claims, 6 Drawing Sheets

(56) References Cited

U.S. PATENT DOCUMENTS

| | | | | |
|---|---|---|---|---|
| 2014/0008990 | A1* | 1/2014 | Yoon | H02J 7/0044 307/104 |
| 2014/0194092 | A1* | 7/2014 | Wanstedt | H04W 4/24 455/406 |
| 2017/0288739 | A1* | 10/2017 | Shin | H04W 52/283 |
| 2018/0105053 | A1* | 4/2018 | Ahmed | B60L 53/38 |
| 2019/0148969 | A1 | 5/2019 | Casse et al. | |
| 2020/0381955 | A1* | 12/2020 | Soryal | H04W 4/40 |
| 2021/0013750 | A1* | 1/2021 | Kronander | H02J 50/80 |
| 2021/0195501 | A1* | 6/2021 | Bittner | H04W 36/0077 |
| 2024/0072550 | A1* | 2/2024 | Zeine | H02J 7/64 |
| 2024/0178707 | A1* | 5/2024 | Hong | H02J 50/20 |

OTHER PUBLICATIONS

Chinese Patent Application No. 202180000844.4, Office Action with English translation dated Jan. 31, 2026, 14 pages.

PCT/CN2021/083426, International Search Report dated Dec. 30, 2021, 2 pages.

* cited by examiner

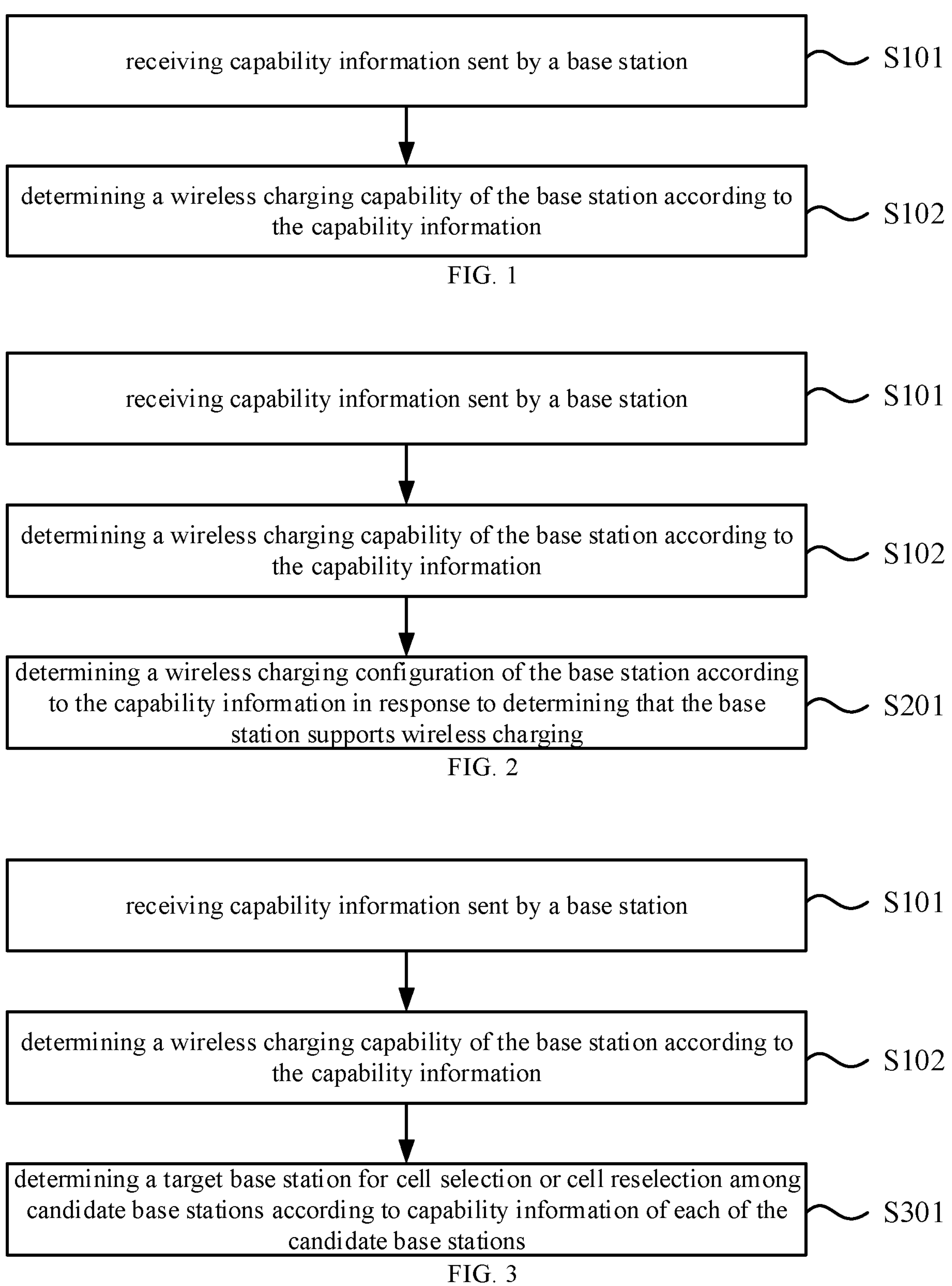
receiving capability information sent by a base station
S101
determining a wireless charging capability of the base station according to the capability information
S102
FIG. 1
receiving capability information sent by a base station
S101
determining a wireless charging capability of the base station according to the capability information
S102
determining a wireless charging configuration of the base station according to the capability information in response to determining that the base station supports wireless charging
S201
FIG. 2
receiving capability information sent by a base station
S101
determining a wireless charging capability of the base station according to the capability information
S102
determining a target base station for cell selection or cell reselection among candidate base stations according to capability information of each of the candidate base stations
S301
FIG. 3 capability determination apparatus capability receiving module 801 capability determination module 802

SYSTEM AND METHOD FOR WIRELESS CHARGING CAPABILITY DETERMINATION AND INDICATION

CROSS-REFERENCE TO RELATED APPLICATION

This application is the US national phase application of International Application No. PCT/CN2021/083426, filed on Mar. 26, 2021, the entire contents of which are incorporated herein by reference for all purposes.

TECHNICAL FIELD

The present disclosure relates to the field of communication technologies, and in particular, to a capability determination method and device, and a capability indication method and device.

BACKGROUND

With the development of cellular mobile communication technology, especially the millimeter wave communication technology, more and more antennas can be configured on a base station. For example, Massive MIMO (Massive Multiple-Input Multiple-Output) technology in 5G relies on a large number of antennas for implementation. Based on a large number of antennas, some base stations can also provide a wireless charging service for a terminal.

SUMMARY

According to a first aspect of embodiments of the present disclosure, a capability determination method is provided. The method is applicable to a terminal, and includes:

- receiving capability information sent by a base station; and
- determining a wireless charging capability of the base station according to the capability information.

According to a second aspect of embodiments of the present disclosure, a capability indication method is provided. The method is applicable to a base station, and includes:

- sending capability information to a terminal, in which the capability information is configured to indicate a wireless charging capability of the base station.

According to a third aspect of embodiments of the present disclosure, a terminal is provided. The terminal includes:

- a processor; and
- a memory configured to store a computer program;
- in which the processor is configured to:
- receive capability information sent by a base station; and
- determine a wireless charging capability of the base station according to the capability information.

According to a fourth aspect of embodiments of the present disclosure, a base station is provided. The base station includes:

- a processor; and
- a memory configured to store a computer program;
- in which the processor is configured to execute the above-mentioned capability indication method.

According to some embodiments of the present disclosure, the base station indicates the wireless charging capability to the terminal, so that the terminal can determine the wireless charging capability of the base station, and the terminal can selectively perform an appropriate action with reference to the wireless charging capability of the base station when performing subsequent actions.

BRIEF DESCRIPTION OF THE DRAWINGS

In order to illustrate technical solutions in embodiments of the present disclosure more clearly, the following briefly introduces the accompanying drawings used in the description of embodiments.

FIG. 1 is a schematic flowchart of a capability determination method according to embodiments of the present disclosure.

FIG. 2 is a schematic flowchart of another capability determination method according to embodiments of the present disclosure.

FIG. 3 is a schematic flowchart of yet another capability determination method according to embodiments of the present disclosure.

DETAILED DESCRIPTION

Figures 4, 5:
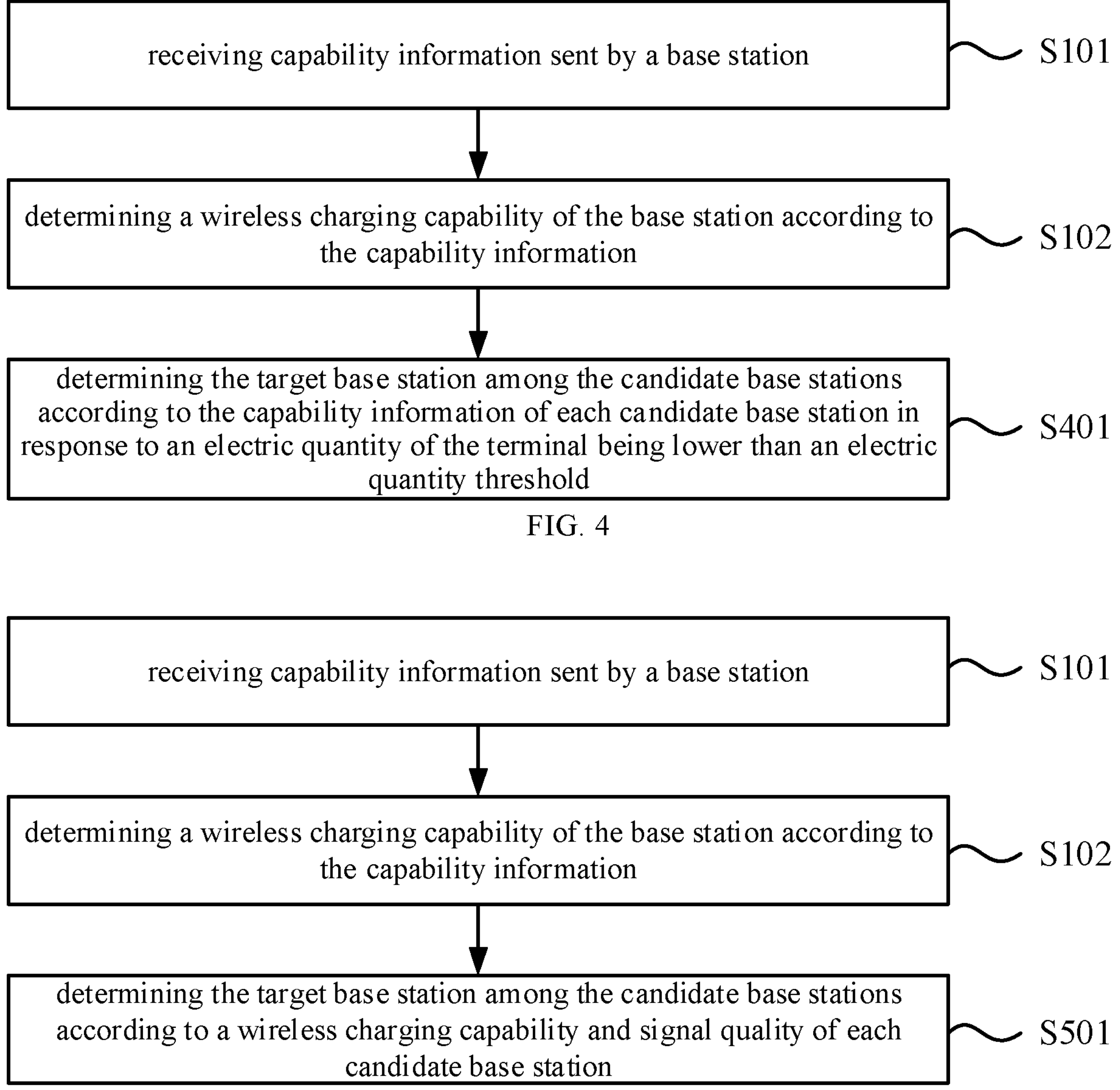
FIG. 4 is a schematic flowchart of yet another capability determination method according to embodiments of the present disclosure.
FIG. 5 is a schematic flowchart of yet another capability determination method according to embodiments of the present disclosure.

The technical solutions in embodiments of the present disclosure will be described below with reference to the accompanying drawings in the embodiments of the present disclosure. Obviously, the described embodiments are only a part of embodiments, not all of embodiments of the present disclosure. Based on the embodiments in the present disclosure, all other embodiments obtained by those of ordinary skill in the art without creative efforts shall fall within the protection scope of the present disclosure.

Terms used in embodiments of the present disclosure are only for the purpose of describing particular embodiments, and are not intended to limit embodiments of the present disclosure. As used in embodiments of the present disclosure and the appended claims, the singular forms "a" and "this"

are intended to include the plural forms as well, unless the context clearly dictates otherwise. It will also be understood that the term "and/or" as used herein refers to and includes any and all possible combinations of one or more of the associated listed items.

It should be understood that although the terms first, second, third, etc., may be used in embodiments of the present disclosure to describe various pieces of information, such information should not be limited to these terms. These terms are only used to distinguish the same type of information from each other. For example, without departing from the scope of embodiments of the present disclosure, first information may also be referred to as second information, and similarly, the second information may also be referred to as the first information. Depending on the context, the word "if" as used herein can be interpreted as "at the time of" or "when" or "in response to determining".

For the purpose of brevity and ease of understanding, the terms "greater than" or "less than", "higher than" or "lower than" are used herein when characterizing the relationship of magnitude. But for those skilled in the art, it can be understood that the term "greater than" also covers the meaning of "greater than or equal to", and "less than" also covers the meaning of "less than or equal to"; the term "higher than" covers the meaning of "higher than or equal to", and "lower than" also covers the meaning of "less than or equal to".

FIG. 1 is a schematic flowchart of a capability determination method according to embodiments of the present disclosure. The capability determination method shown in embodiments can be applicable to a terminal. The terminal includes but is not limited to a communication device, such as a mobile phone, a tablet computer, a wearable device, a sensor, and an Internet of Things device. The terminal may communicate with a base station as a user equipment, and the base station includes but is not limited to a 4G base station, a 5G base station, and a 6G base station.

In an embodiment, the base station may be a base station to which a capability indication method described in any subsequent embodiment is applicable.

As shown in FIG. 1, the capability determination method may include the following steps.

In step S101, capability information sent by a base station is received.

In step S102, a wireless charging capability of the base station is determined according to the capability information.

In an embodiment, the base station may generate capability information according to its own wireless charging capability, and then send the capability information to the terminal, so that the terminal can determine the wireless charging capability of the base station according to the capability information.

In an embodiment, a manner in which the base station sends the capability information to the terminal includes but is not limited to broadcast, multicast, or unicast.

For example, the base station sends the capability information in a broadcast manner, and the capability information may be carried in a system information block SIB, specifically in an existing system information block or in a newly added system information block.

For example, the base station sends the capability information in a unicast manner, and the capability information may be carried in a Radio Resource Control (RRC) signaling, or in system information sent on demand. In this case, the base station may automatically send the capability information to the terminal, or may send the capability information to the terminal after receiving a request of obtaining the capability information from the terminal.

In an embodiment, for different communication systems, an adopted RRC signaling may be different.

For example, in a 4G communication system, the RRC signaling carrying capability information includes but is not limited to:

an RRC connection reconfiguration signaling;

an RRC connection setup signaling;

an RRC connection resume signaling; or an RRC connection reestablishment signaling.

For example, in a 5G communication system, the RRC signaling carrying capability information includes but is not limited to:

an RRC reconfiguration signaling;

an RRC setup signaling;

an RRC resume signaling; or an RRC reestablishment signaling.

It should be noted that, in all embodiments of the present disclosure, whether the base station has a wireless charging capability may specifically refer to whether the base station has a wireless charging capability in a specific manner, in which the specific manner includes at least one of:

an electromagnetic induction manner, an electromagnetic resonance manner, a wireless radio frequency manner.

In an embodiment, the capability information may be configured to indicate whether the base station has a wireless charging capability in a wireless radio frequency manner, and may specifically be a charging capability of over-the-air charging.

The base station has the capability of over-the-air charging, which means that the base station can transmit energy to the terminal in the form of millimeter waves and narrow bandwidth through multiple antennas, and the terminal can receive the energy through the micro beacon antenna, and then convert it into electric energy to realize charging. The base station has the capability of over-the-air charging, which may further mean that the base station can determine the location of the terminal, and then transmit energy to the terminal at the location for charging.

According to embodiments of the present disclosure, the base station indicates the wireless charging capability to the terminal, so that the terminal can determine the wireless charging capability of the base station, and the terminal can selectively perform an appropriate action with reference to the wireless charging capability of the base station when performing subsequent actions.

For example, when the terminal performs subsequent operations such as cell selection, the current main terminal detects quality of neighboring cells, and selects an appropriate cell to access according to the signal quality. According to the embodiment, the terminal may receive capability information sent (such as broadcast) by a base station corresponding to each neighboring cell, and then determine a wireless charging capability of each cell, and then can comprehensively consider the signal quality and the wireless charging capabilities of neighboring cells to determine an appropriate cell to access.

How the terminal selects an appropriate cell will be described in detail in subsequent embodiments. In addition, the subsequent actions performed by the terminal according to the wireless charging capability of the base station in the present disclosure include but are not limited to cell selection and cell charging.

In an embodiment, the wireless charging capability includes one of:

supporting wireless charging, or not supporting wireless charging.

The base station may indicate to the terminal through the capability information that the base station supports wireless charging or does not support wireless charging.

FIG. 2 is a schematic flowchart of another capability determination method according to embodiments of the present disclosure. As shown in FIG. 2, in some embodiments, the method further includes:

in step S201, in response to determining that the base station supports wireless charging, a wireless charging configuration of the base station is determined according to the capability information.

In an embodiment, the wireless charging configuration includes at least one of:

a wireless charging power, a wireless charging duration, or a wireless charging frequency.

In an embodiment, the wireless charging power refers to a charging power supported by the base station when wirelessly charging the terminal, and the wireless charging power may include one or more powers, that is, the base station may charge the terminal according to only one power, or may select a power suitable for the terminal from multiple supported charging powers according to a charging power required by the terminal to charge the terminal.

In an embodiment, the wireless charging duration refers to a maximum duration that the base station can continuously charge the terminal each time, and the base station can determine the duration according to its own load. For example, the load and the duration are in inverse correlation, the higher the load, the shorter the charging duration for the terminal, and the lower the load, the longer the charging duration for the terminal.

In an embodiment, the wireless charging frequency refers to a charging frequency supported by the base station when wirelessly charging the terminal, and the charging frequency may be the same as or different from the frequency used for communication between the base station and the terminal. The wireless charging frequency may include one or more frequencies, that is, the base station may charge the terminal in only one frequency, or may select a frequency suitable for the terminal from multiple charging frequencies according to frequencies supported by the terminal to charge the terminal.

In an embodiment, when the base station supports wireless charging, a specific wireless charging configuration may also be carried in the capability information, and the terminal may determine the wireless charging configuration of the base station according to the capability information. When a radio frequency signal of the base station is subsequently received for charging, the charging can be performed according to the determined wireless charging configuration. For example, a corresponding frequency can be selected according to the wireless charging frequency to receive the radio frequency signal sent by the base station for charging.

It should be noted that the wireless charging configuration includes but is not limited to the three configurations in the above examples, and other configurations, such as a wireless charging interval, can also be set as required.

FIG. 3 is a schematic flowchart of yet another capability determination method according to embodiments of the present disclosure. As shown in FIG. 3, in some embodiments, the method further includes:

in step S301, a target base station for cell selection or cell reselection is determined among candidate base stations according to capability information of each of the candidate base stations.

In an embodiment, after receiving the capability information of the base station, the terminal may determine the target base station for base station selection or cell reselection among the candidate base stations according to the capability information. The candidate base station may be a base station corresponding to a neighboring cell of the serving cell where the terminal is currently located, or the candidate base station may be determined in other ways, which may be specifically selected as required, and is not limited in the present disclosure.

The terminal determines the target base station to perform cell selection or cell reselection according to the capability information, which can ensure that the target base station accessed after cell selection or cell reselection can meet the charging demand of the terminal, thereby ensuring that the terminal can be successfully charged in the cell corresponding to the target base station, and communicate well.

In an embodiment, the terminal may determine the target base station among the candidate base stations according to whether the candidate base stations have wireless charging capability.

For example, the terminal may preferentially select a base station with wireless charging capability as the target base station to ensure that after accessing the target base station, the target base station can charge the terminal; the terminal may preferentially select a base station without wireless charging capability as the target base station. The performance of the base station itself will be more or less affected when performing wireless charging. After the terminal selects the base station without wireless charging capability as the target base station to access, it is beneficial to ensure relatively good communication quality.

In an embodiment, when there are multiple base stations with wireless charging capability among the candidate base stations, the terminal may determine the target base station among these multiple base stations according to the wireless charging configuration.

For example, for multiple base stations with wireless charging capability, the terminal may determine a base station with the highest wireless charging power as the target base station, so that after accessing the target base station, the charging can be completed as soon as possible with a higher power. The terminal may also determine a base station that supports the longest duration of wireless charging as the target base station, so that after accessing the base station, high power consumption operations can be performed for a long time without running out of power. Multiple configurations in the wireless charging configuration may also be comprehensively considered, for example, performing weighted summation on multiple configurations, and a target base station is determined among the multiple base stations according to a weighted summation result.

FIG. 4 is a schematic flowchart of yet another capability determination method according to embodiments of the present disclosure. As shown in FIG. 4, in some embodiments, determining the target base station for cell selection or cell reselection among the candidate base stations according to the capability information of each candidate base station includes:

in step S401, in response to an electric quantity of the terminal being lower than an electric quantity threshold, the target base station is determined among the candidate base stations according to the capability information of each candidate base station.

In an embodiment, in a case that the terminal is low in its electric quantity, for example, lower than the power threshold, it may determine the target base station among the candidate base stations according to the capability information when selecting the target base station, which is beneficial to ensure that a candidate base station that supports wireless charging is selected as the target base station to charge the terminal, so as to avoid battery depletion of the terminal.

In an embodiment, in a case that the terminal predicts that it will perform a service with a faster power consumption (for example, higher than a speed threshold), it may determine the target base station among the candidate base stations according to the capability information when selecting the target base station, which is beneficial to ensure that a candidate base station that supports wireless charging is selected as the target base station to charge the terminal, so as to avoid excessive battery depletion when the terminal performs services that consume faster power.

FIG. 5 is a schematic flowchart of yet another capability determination method according to embodiments of the present disclosure. As shown in FIG. 5, in some embodiments, determining the target base station for cell selection or cell reselection among the candidate base stations according to the capability information of each candidate base station includes:

in step S501, the target base station is determined among the candidate base stations according to a wireless charging capability and signal quality of each candidate base station.

In an embodiment, when the terminal selects the target base station among the candidate base stations, the wireless charging capabilities and signal quality of the candidate base stations may be comprehensively considered. The signal quality may be determined by a reference signal received by the terminal and sent by the candidate base station, for example, according to the reference signal received power RSRP, reference signal received quality RSRQ, etc.

At present, for determining the target cell among the candidate cells, only the signal quality of the candidate cells is considered. Although selecting the candidate cell with the best signal quality as the target cell can ensure that the terminal has good communication quality after accessing the target cell, but there is still a charging demand for the terminal. Therefore, in addition to the signal quality, the terminal may also consider the wireless charging capability to ensure that the terminal can meet the charging demand after accessing the target base station.

For example, the terminal may first determine the base stations with wireless charging capability among the candidate base stations, and then determine the base station with the best signal quality as the target base station among the base stations with wireless charging capability. Based on this, it can not only ensure to meet the charging demand after the terminal accesses the target base station, but also ensure good communication quality after the terminal accesses the target base station as much as possible.

Figures 6, 7, 8:
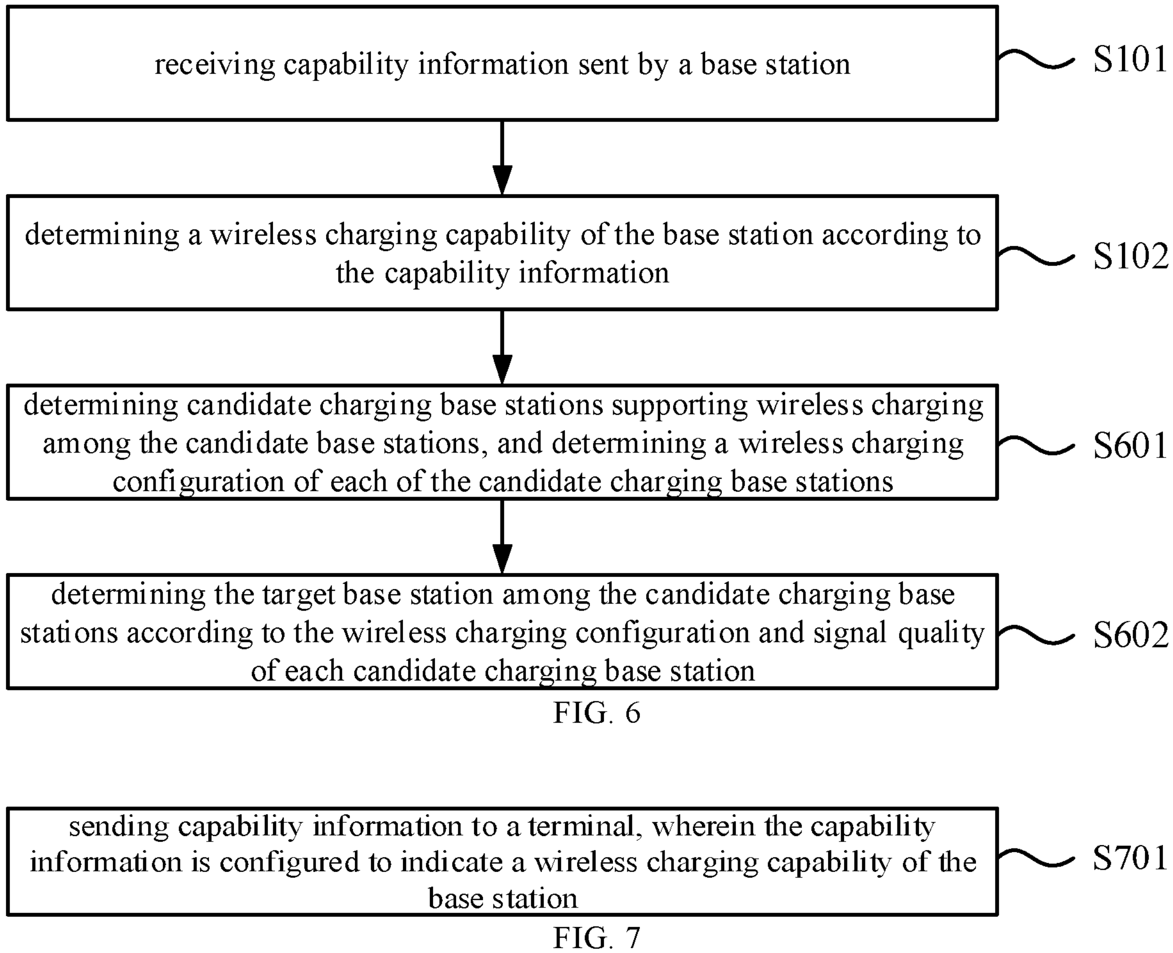
FIG. 6 is a schematic flowchart of yet another capability determination method according to embodiments of the present disclosure.
FIG. 7 is a schematic flowchart of a capability indication method according to embodiments of the present disclosure.
FIG. 8 is a schematic block diagram of a capability determination apparatus according to embodiments of the present disclosure.

FIG. 6 is a schematic flowchart of yet another capability determination method according to embodiments of the present disclosure. As shown in FIG. 6, in some embodiments, determining the target base station for cell selection or cell reselection among the candidate base stations according to the capability information of each candidate base station includes:

in step S601, candidate charging base stations supporting wireless charging are determined among the candidate base stations, and a wireless charging configuration of each of the candidate charging base stations is determined; and in step S602, the target base station is determined among the candidate charging base stations according to the wireless charging configuration and signal quality of each candidate charging base station.

In an embodiment, the terminal may first determine candidate charging base stations that support wireless charging among the candidate base stations, and may also determine the wireless charging configurations for the candidate charging base stations. Further, the target base station can be determined among the candidate charging base stations according to the wireless charging configurations and signal quality of the candidate charging base stations.

For example, the terminal may first determine candidate charging base stations with wireless charging capability among the candidate base stations, and then determine a base station with the best signal quality as the target base station among the candidate charging base stations. Based on this, it can not only ensure to meet the charging demand after the terminal accesses the target base station, but also ensure good communication quality after the terminal accesses the target base station as much as possible.

In addition to determining the target base station among the candidate charging base stations in the above manner, the target base station in the candidate charging base stations may also be determined in other manners, such as a weighted summation manner described in the following embodiments.

In an embodiment, determining the target base station among the candidate charging base stations according to the wireless charging configuration and the signal quality of each candidate charging base station includes:

performing weighted summation on the wireless charging configuration and the signal quality of the candidate charging base station to obtain reference information; and determining the target base station among the candidate charging base stations according to the reference information of each candidate charging base station.

That is to say, the terminal can set weights for wireless charging configuration and signal quality respectively. For each configuration in the wireless charging configuration, the set weights can be the same or different. For example, the weight set for the wireless charging power and the weight set for the wireless charging duration can be different.

Then, according to the set weights, weighted summation is performed on the wireless charging configuration and signal quality of the candidate charging base station to obtain reference information. For example, each configuration in the wireless charging configuration and signal quality can be converted into a unitless value, and then weighted summation is performed on each configuration and signal quality according to the set weights, and an obtained value is the reference information. The terminal can determine the target base station among the candidate charging base stations according to the reference information of each candidate charging base station, which can ensure that the target base station selected for access as a whole best meets the needs of the terminal.

It should be noted that the above weights can be set by the terminal according to its own needs or indicated by the base station to the terminal, which can be selected according to the needs. In some special cases, some of the weights may be set to zero, for example, the weight of the signal quality may be set to zero, then only the wireless charging configuration of the base station may be considered to select the target base station. An example is mainly provided below in the case that the terminal is set according to its own needs.

In an embodiment, determining the target base station among the candidate charging base stations according to the wireless charging configuration and the signal quality of each candidate charging base station further includes:

determining a weight for the wireless charging configuration of the candidate charging base station according to a matching degree between a wireless charging configuration required by the terminal and the wireless charging configuration of the candidate charging base station.

Due to the different requirements of each terminal, for example, some terminals require a long wireless charging duration, some terminals require a short wireless charging duration, some terminals can support wireless charging with higher power, and some terminals only support wireless charging with lower power.

Therefore, the terminal can first determine the matching degree of each wireless charging configuration required by itself and the corresponding wireless charging configuration of the candidate charging base station, and set the weight of each wireless charging configuration according to the matching degree. For example, for n wireless charging configurations, a value of an i-th configuration required by the terminal is Ci, and a value of an i-th configuration of the candidate charging base station is Ci', and an absolute value of a difference between Ci and Ci' may be calculated. The smaller the absolute value of the difference is, the higher the matching degree is, and the higher the weight value is. On the contrary, the larger the absolute value of the difference is, the lower the matching degree is, and the lower the weight value is.

The n wireless charging configurations include but are not limited to the above-mentioned wireless charging power, wireless charging duration, wireless charging frequency, and the like.

Accordingly, it can be ensured that a base station with a configuration with a relatively higher matching degree is preferably selected as the target base station, which is beneficial to ensure that the configuration adopted by the target base station is more suitable for the terminal when performing wireless charging for the terminal subsequently through the target base station.

FIG. 7 is a schematic flowchart of a capability indication method according to embodiments of the present disclosure. The capability indication method shown in the embodiments may be applicable to a base station, and the base station includes but is not limited to a 4G base station, a 5G base station, and a 6G base station. The base station may communicate with a terminal serving as a user equipment, and the terminal includes but is not limited to a communication device, such as a mobile phone, a tablet computer, a wearable device, a sensor, and an Internet of Things device.

In an embodiment, the terminal may be a terminal to which the capability determination method described in any of the foregoing embodiments is applicable.

As shown in FIG. 7, the capability indication method may include the following steps:

in step S701, capability information is sent to a terminal, in which the capability information is configured to indicate a wireless charging capability of the base station.

In an embodiment, the base station may generate the capability information according to its own wireless charging capability, and then send the capability information to the terminal, so that the terminal can determine the wireless charging capability of the base station according to the capability information.

In an embodiment, a manner in which the base station sends the capability information to the terminal includes but is not limited to broadcast, multicast, and unicast.

For example, the base station sends the capability information in a broadcast manner, and the capability information may be carried in a system information block SIB, specifically in an existing system information block or in a newly added system information block.

For example, the base station sends the capability information in a unicast manner, and the capability information may be carried in a Radio Resource Control (RRC) signaling, or in system information sent on demand. In this case, the base station may automatically send the capability information to the terminal, or may send the capability information to the terminal after receiving a request of obtaining the capability information from the terminal.

In an embodiment, for different communication systems, an adopted RRC signaling may be different.

For example, in a 4G communication system, the RRC signaling carrying capability information includes but is not limited to:

an RRC connection reconfiguration signaling;

an RRC connection setup signaling;

an RRC connection resume signaling; or an RRC connection reestablishment signaling.

For example, in a 5G communication system, the RRC signaling carrying capability information includes but is not limited to:

an RRC reconfiguration signaling;

an RRC setup signaling;

an RRC resume signaling; or an RRC reestablishment signaling.

It should be noted that, in all embodiments of the present disclosure, whether the base station has a wireless charging capability may specifically refer to whether the base station has wireless charging capability in a specific manner, and the specific manner includes at least one of:

an electromagnetic induction manner, an electromagnetic resonance manner, a wireless radio frequency manner.

In an embodiment, the capability information may be configured to indicate whether the base station has a wireless charging capability in a wireless radio frequency manner, and may specifically be a charging capability of over-the-air charging.

The base station has the capability of over-the-air charging, which means that the base station can transmit energy to the terminal in the form of millimeter waves and narrow bandwidth through multiple antennas, and the terminal can receive the energy through the micro beacon antenna, and then convert it into electric energy to realize charging. The base station has the capability of over-the-air charging, which may further mean that the base station can determine the location of the terminal, and then transmit energy to the terminal at the location for charging.

According to embodiments of the present disclosure, the base station indicates the wireless charging capability to the terminal, so that the terminal can determine the wireless charging capability of the base station, and the terminal can selectively perform an appropriate action with reference to the wireless charging capability of the base station when performing subsequent actions.

In an embodiment, the wireless charging capability includes one of:

supporting wireless charging, or not supporting wireless charging.

The base station may indicate to the terminal through the capability information that the base station supports wireless charging or does not support wireless charging.

In an embodiment, in response to the base station supporting wireless charging, the capability information is further configured to indicate a wireless charging configuration of the base station.

In an embodiment, the wireless charging configuration includes at least one of:

a wireless charging power, a wireless charging duration, or a wireless charging frequency.

In an embodiment, the wireless charging power refers to a charging power supported by the base station when wirelessly charging the terminal, and the wireless charging power may include one or more powers, that is, the base station may charge the terminal according to only one power, or may select a power suitable for the terminal from multiple supported charging powers according to a charging power required by the terminal to charge the terminal.

In an embodiment, the wireless charging duration refers to a maximum duration that the base station can continuously charge the terminal each time, and the base station can determine the duration according to its own load. For example, the load and the duration are in inverse correlation, the higher the load, the shorter the charging duration for the terminal, and the lower the load, the longer the charging duration for the terminal.

In an embodiment, the wireless charging frequency refers to a charging frequency supported by the base station when wirelessly charging the terminal, and the charging frequency may be the same as or different from the frequency used for communication between the base station and the terminal. The wireless charging frequency may include one or more frequencies, that is, the base station may charge the terminal in only one frequency, or may select a frequency suitable for the terminal from multiple charging frequencies according to frequencies supported by the terminal to charge the terminal.

In an embodiment, when the base station supports wireless charging, a specific wireless charging configuration may also be carried in the capability information, and the terminal may determine the wireless charging configuration of the base station according to the capability information. When a radio frequency signal of the base station is subsequently received for charging, the charging can be performed according to the determined wireless charging configuration. For example, a corresponding frequency can be selected according to the wireless charging frequency to receive the radio frequency signal sent by the base station for charging.

It should be noted that the wireless charging configuration includes but is not limited to the three configurations in the above example, and other configurations, such as a wireless charging interval, can also be set as required.

Corresponding to the foregoing embodiments of the capability determination method and capability indication method, the present disclosure also provides embodiments of a capability determination apparatus and a capability indication apparatus.

FIG. 8 is a schematic block diagram of a capability determination apparatus according to embodiments of the present disclosure. The capability determination apparatus shown in the embodiments can be applicable to a terminal, and the terminal includes but is not limited to a communication device, such as a mobile phone, a tablet computer, a wearable device, a sensor, and an Internet of Things device. The terminal may communicate with a base station as a user equipment, and the base station includes but is not limited to a 4G base station, a 5G base station, and a 6G base station.

As shown in FIG. 8, the capability determination apparatus may include:

a capability receiving module 801, configured to receive capability information sent by a base station;

a capability determination module 802, configured to determine a wireless charging capability of the base station according to the capability information.

In an embodiment, the wireless charging capability includes one of:

supporting wireless charging, or not supporting wireless charging.

Figure 9:
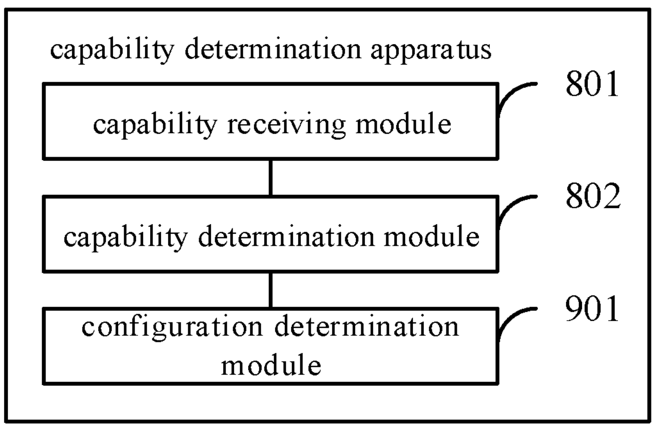
FIG. 9 is a schematic block diagram of another capability determination apparatus according to embodiments of the present disclosure.

FIG. 9 is a schematic block diagram of another capability determination apparatus according to embodiments of the present disclosure. As shown in FIG. 9, the apparatus further includes:

a configuration determination module 901, configured to, in response to determining that the base station supports wireless charging, determine a wireless charging configuration of the base station according to the capability information.

In an embodiment, the wireless charging configuration includes at least one of:

a wireless charging power, a wireless charging duration, or a wireless charging frequency.

Figure 10:
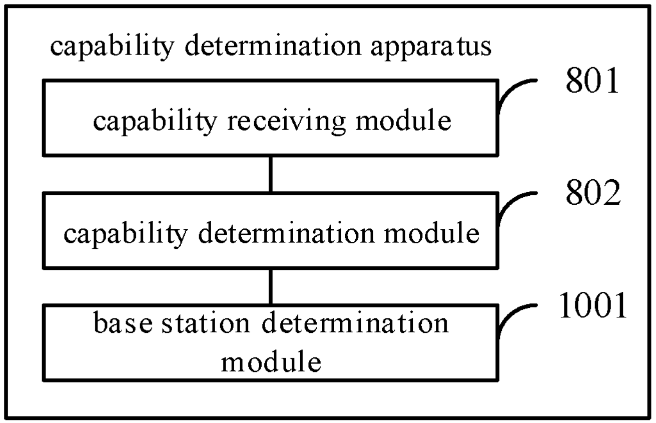
FIG. 10 is a schematic block diagram of yet another capability determination apparatus according to embodiments of the present disclosure.

FIG. 10 is a schematic block diagram of yet another capability determination apparatus according to an embodiment of the present disclosure. As shown in FIG. 10, the apparatus further includes:

a base station determination module 1001, configured to determine a target base station for cell selection or cell reselection among candidate base stations according to capability information of each candidate base station.

In an embodiment, the base station determination module is configured to determine the target base station among the candidate base stations according to the capability information of each candidate base station in response to an electric quantity of the terminal being lower than an electric quantity threshold.

In an embodiment, determining the target base station for cell selection or cell reselection among the candidate base stations according to the capability information of each of the candidate base stations includes:

determining the target base station among the candidate base stations according to a wireless charging capability and signal quality of each candidate base station.

In an embodiment, the base station determination module is configured to determine candidate charging base stations supporting wireless charging among the candidate base stations, and determine a wireless charging configuration of each candidate charging base station; and determine the target base station among the candidate charging base stations according to the wireless charging configuration and signal quality of each candidate charging base station.

In an embodiment, the base station determination module is configured to perform weighted summation on the wireless charging configuration and signal quality of the candidate charging base station to obtain reference information; and determine the target base station among the candidate charging base stations according to reference information of each candidate charging base station.

Figure 11:
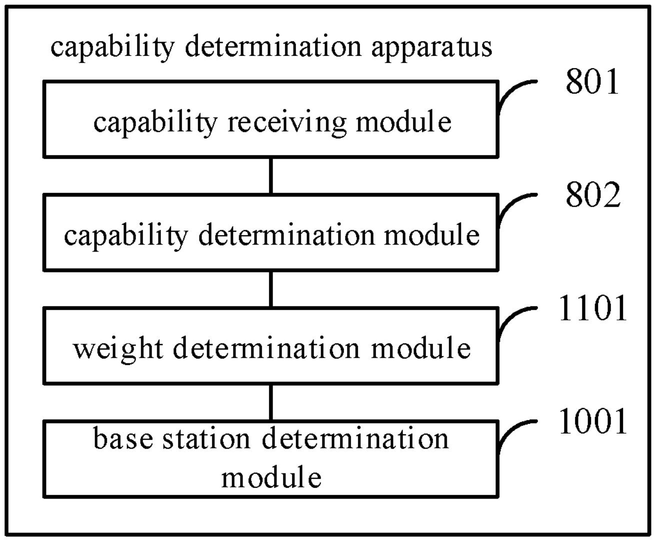
FIG. 11 is a schematic block diagram of yet another capability determination apparatus according to embodiments of the present disclosure.

FIG. 11 is a schematic block diagram of yet another capability determination apparatus according to embodiments of the present disclosure. As shown in FIG. 11, the apparatus further includes:

a weight determination module 1101, configured to determine a weight for the wireless charging configuration of the candidate charging base station according to a matching degree between a wireless charging configuration required by the terminal and the wireless charging configuration of the candidate charging base station.

Figure 12:
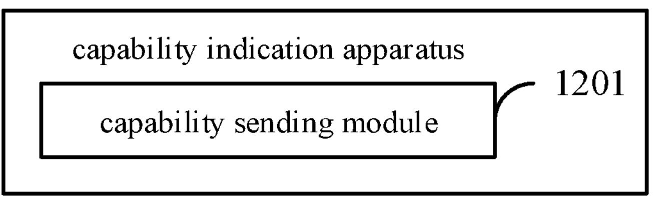
FIG. 12 is a schematic block diagram of a capability indication apparatus according to embodiments of the present disclosure.

FIG. 12 is a schematic block diagram of a capability indication apparatus according to embodiments of the present disclosure. The capability indication apparatus shown in the embodiments can be applicable to a base station, and the base station includes but is not limited to a 4G base station, a 5G base station, and a 6G base station. The base station may communicate with a terminal serving as a user equipment, and the terminal includes but is not limited to a communication device, such as a mobile phone, a tablet computer, a wearable device, a sensor, and an Internet of Things device.

As shown in FIG. 12, the apparatus includes:

a capability sending module 1201, configured to send capability information to a terminal, in which the capability information is configured to indicate a wireless charging capability of the base station.

In an embodiment, the wireless charging capability includes one of:

supporting wireless charging, or not supporting wireless charging.

In an embodiment, in response to the base station supporting wireless charging, the capability information is further configured to indicate a wireless charging configuration of the base station.

In an embodiment, the wireless charging configuration includes at least one of:

a wireless charging power, a wireless charging duration, or a wireless charging frequency.

Regarding the apparatuses in the foregoing embodiments, the specific manners in which each module performs operations have been described in detail in the embodiments of the related methods, and will not be described in detail here.

For the apparatus embodiments, since they basically correspond to the method embodiments, reference may be made to the partial descriptions of the method embodiments for related parts. The apparatus embodiments described above are only illustrative, in which the modules described as separate components may or may not be physically separated, and the components shown as modules may or may not be physical modules, that is, they may be located in one place, or it can be distributed over multiple network modules. Some or all of the modules may be selected according to actual needs to achieve the purpose of the solution in the embodiments. Those of ordinary skill in the art can understand and implement it without creative effort.

Embodiments of the present disclosure further provide a communication device, including:

a processor; and a memory configured to store a computer program;

when the computer program is executed by the processor, the capability determination method described in any of the foregoing embodiments is implemented.

Embodiments of the present disclosure further provide a communication device, including:

a processor; and a memory configured to store a computer program;

when the computer program is executed by the processor, the capability indication method described in any of the foregoing embodiments is implemented.

Embodiments of the present disclosure further provide a computer-readable storage medium configured to store a computer program. When the computer program is executed by a processor, steps of the capability determination method described in any of the foregoing embodiments are implemented.

Embodiments of the present disclosure further provide a computer-readable storage medium configured to store a computer program. When the computer program is executed by a processor, steps of the capability indication method described in any of the foregoing embodiments are implemented.

Figure 13:
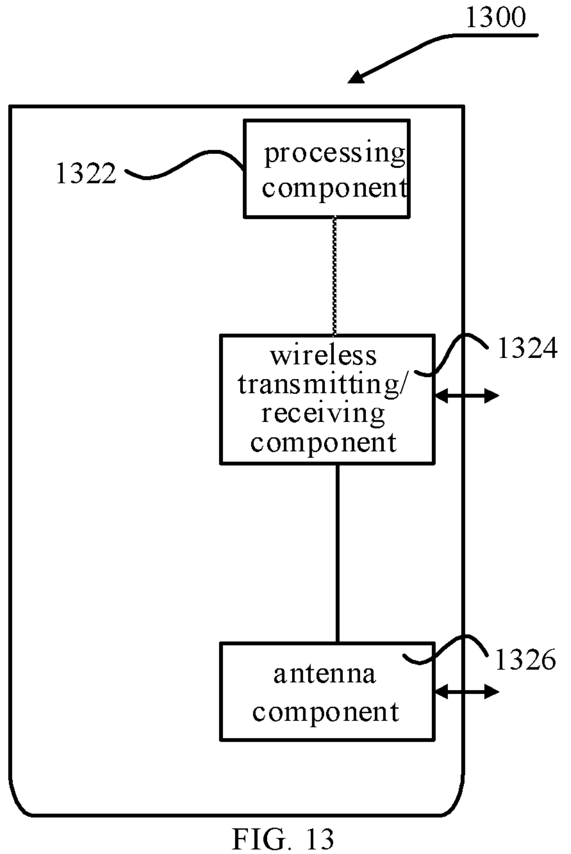
FIG. 13 is a schematic block diagram of a device for capability indication according to embodiments of the present disclosure.

As shown in FIG. 13, FIG. 13 is a schematic block diagram of a device 1300 for capability indication according to embodiments of the present disclosure. The device 1300 can be provided as a base station. Referring to FIG. 13, the device 1300 includes a processing component 1322, a wireless transmitting/receiving component 1324, an antenna component 1326, and a signal processing portion specific to a wireless interface. The processing component 1322 may further include one or more processors. One of the processors in the processing component 1322 may be configured to implement the capability indication method described in any of the foregoing embodiments.

Figure 14:
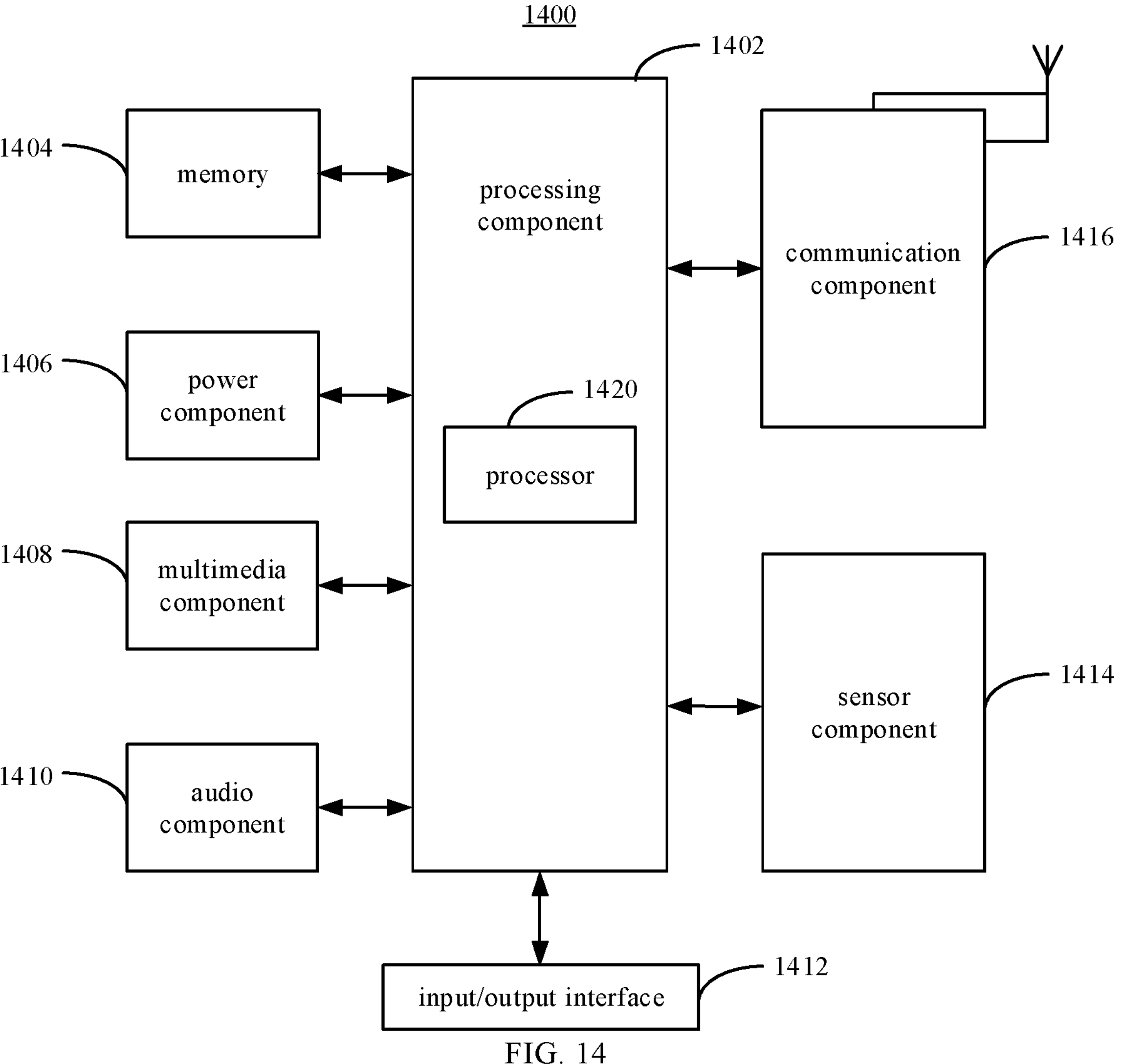
FIG. 14 is a schematic block diagram of a device for capability determination according to embodiments of the present disclosure.

FIG. 14 is a schematic block diagram of a device 1400 for capability determination according to embodiments of the present disclosure. For example, the device 1400 may be a mobile phone, computer, digital broadcast terminal, messaging device, game console, tablet device, medical device, fitness device, personal digital assistant, and the like.

Referring to FIG. 14, the device 1400 may include a processing component 1402, a memory 1404, a power supply component 1406, a multimedia component 1408, an audio component 1410, an input/output (I/O) interface 1412, a sensor component 1414, and a communication component 1416.

The processing component 1402 generally controls the overall operations of the device 1400, such as operations associated with display, phone calls, data communications, camera operations, and recording operations. The processing component 1402 may include at least one processor 1420 to execute instructions to perform all or part of the steps of the above-described methods. Additionally, the processing component 1402 can include at least one module that facilitates interaction between the processing component 1402 and other components. For example, the processing component 1402 may include a multimedia module to facilitate interaction between the multimedia component 1408 and the processing component 1102.

The memory 1404 is configured to store various types of data to support operations at the device 1400. Examples of such data include instructions for any application or method operating on the device 1400, contact data, phonebook data, messages, pictures, videos, etc. The memory 1404 may be implemented by any type of volatile or non-volatile storage device or combination thereof, such as static random access memory (SRAM), electrically erasable programmable read only memory (EEPROM), erasable Programmable Read Only Memory (EPROM), Programmable Read Only Memory (PROM), Read Only Memory (ROM), Magnetic Memory, Flash Memory, Magnetic or Optical Disk.

The power component 1406 provides power to various components of the device 1400. The power component 1406 may include a power management system, at least one power source, and other components associated with generating, managing, and distributing power to the device 1400.

The multimedia component 1408 includes screens that provide an output interface between the device 1400 and the user. In some embodiments, the screen may include a liquid crystal display (LCD) and a touch panel (TP). If the screen includes a touch panel, the screen may be implemented as a touch screen to receive input signals from a user. The touch panel includes at least one touch sensor to sense touch, swipe, and gestures on the touch panel. The touch sensor may not only sense the boundaries of a touch or swipe action, but also detect wake-up time and pressure associated with the touch or swipe action. In some embodiments, the multimedia component 1408 includes a front camera and/or a rear camera. When the device 1400 is in an operation mode, such as a shooting mode or a video mode, the front camera and/or the rear camera may receive external multimedia data. Each of the front and rear cameras can be a fixed optical lens system or have focal length and optical zoom capability.

The audio component 1410 is configured to output and/or input audio signals. For example, the audio component 1410 includes a microphone (MIC) that is configured to receive external audio signals when the device 1400 is in operating modes, such as call mode, recording mode, and voice recognition mode. The received audio signal may be further stored in the memory 1404 or transmitted via the communication component 1416. In some embodiments, the audio component 1410 also includes a speaker for outputting audio signals.

The I/O interface 1412 provides an interface between the processing component 1402 and a peripheral interface module, which may be a keyboard, a click wheel, a button, or the like. These buttons may include, but are not limited to: home button, volume buttons, start button, and lock button.

The sensor component 1414 includes at least one sensor for providing various aspects of status assessment for the device 1400. For example, the sensor component 1414 can detect the on/off state of the device 1400, the relative positioning of the components, such as the display and keypad of the device 1400, the sensor component 1414 can also detect a position change of the device 1400 or a component of the device 1400, a presence or an absence of contact of the user on the device 1400, an orientation or acceleration/deceleration of the device 1400, and a temperature change of the device 1400. The sensor component 1414 may include a proximity sensor configured to detect the presence of nearby objects in the absence of any physical contact. The sensor component 1414 may also include a light sensor, such as a CMOS or CCD image sensor, for use in imaging applications. In some embodiments, the sensor component 1414 may also include an acceleration sensor, a gyroscope sensor, a magnetic sensor, a pressure sensor, or a temperature sensor.

The communication component 1416 is configured to facilitate wired or wireless communications between the device 1400 and other devices. The device 1400 may access a wireless network based on a communication standard, such as WiFi, 2G or 3G, or a combination thereof. In one exemplary embodiment, the communication component 1416 receives broadcast signals or broadcast related information from an external broadcast management system via a broadcast channel. In an exemplary embodiment, the communication component 1416 also includes a near field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology and other technologies.

In an exemplary embodiment, the device 1400 may be implemented by at least one Application Specific Integrated Circuit (ASIC), Digital Signal Processor (DSP), Digital Signal Processing Device (DSPD), Programmable Logic Device (PLD), Field Programmable Gate Array (FPGA), controller, microcontroller, microprocessor or other electronic components to implement the above capability determination methods.

In an exemplary embodiment, there is also provided a non-transitory computer-readable storage medium including instructions, such as a memory 1404 including instructions, which are executable by the processor 1420 of the device 1400 to perform the above capability determination methods. For example, the non-transitory computer-readable storage medium may be a ROM, random access memory (RAM), CD-ROM, magnetic tape, floppy disk, optical data storage device, and the like.

Other embodiments of the present disclosure will readily occur to those skilled in the art upon consideration of the specification and practice of the disclosure disclosed herein. The disclosure is intended to cover any variations, uses, or adaptations of this disclosure that follow the general principles of this disclosure and include common general knowledge or techniques in the technical field not disclosed by the disclosure. The specification and examples are to be regarded as exemplary only, with the true scope and spirit of the disclosure being indicated by the following claims.

It is to be understood that the present disclosure is not limited to the precise structures described above and illustrated in the accompanying drawings, and that various modifications and changes may be made without departing from the scope thereof. The scope of the present disclosure is limited only by the appended claims.

It should be noted that, in the document, relational terms such as "first" and "second" are only used to distinguish one entity or operation from another entity or operation, without necessarily requiring or implying the existence of any such actual relationship or sequence between these entities or operations. The terms "comprise", "include" or any other variation thereof are intended to encompass non-exclusive inclusion such that a process, method, article or device comprising a list of elements includes not only those elements, but also other not expressly listed elements, or also include elements inherent to such a process, method, article or device. Without further limitation, an element qualified by the phrase "comprising a . . . " does not preclude the presence of additional identical elements in a process, method, article or device that includes the element.

The methods and apparatuses provided by the embodiments of the disclosure are described in detail above, and specific examples are applied herein to illustrate the principles and implementation of the disclosure. The above descriptions of embodiments are only used to help understand the method of the disclosure and its core ideas; at the same time, for a person of ordinary skill in the art, there may be changes in specific implementation methods and application scope based on the ideas of the disclosure. In summary, the content of this specification should not be understood as a limitation of the disclosure.

What is claimed is:

1. A capability determination method, performed by a terminal, comprising:

receiving capability information sent by a base station; and determining a wireless charging capability of the base station according to the capability information, wherein the method further comprises:

determining a target base station for cell selection or cell reselection among candidate base stations according to a wireless charging capability of each of the candidate base stations, wherein the target base station provides a wireless charging service for the terminal through multiple antennas of the target bases station, wherein determining the target base station for cell selection or cell reselection among the candidate base stations according to the wireless charging capability of each of the candidate base stations comprises:

determining candidate charging base stations supporting wireless charging among the candidate base stations, and determining a wireless charging configuration of each of the candidate charging base stations; and determining the target base station among the candidate charging base stations according to the wireless charging configuration and signal quality of each candidate charging base station.

2. The method according to claim 1, wherein the wireless charging capability comprises one of:

supporting wireless charging, or not supporting wireless charging.

3. The method according to claim 2, wherein the method further comprises:

determining a wireless charging configuration of the base station according to the capability information in response to determining that the base station supports wireless charging.

4. The method according to claim 3, wherein the wireless charging configuration comprises at least one of:

a wireless charging power, a wireless charging duration, or a wireless charging frequency.

5. The method according to claim 1, wherein an electric quantity of the terminal being lower than an electric quantity threshold.

6. The method according to claim 1, wherein determining the target base station among the candidate charging base stations according to the wireless charging configuration and the signal quality of each candidate charging base station comprises:

performing weighted summation on the wireless charging configuration and the signal quality of the candidate charging base station to obtain reference information; and determining the target base station among the candidate charging base stations according to reference information of each candidate charging base station.

7. The method according to claim 6, wherein determining the target base station among the candidate charging base stations according to the wireless charging configuration and the signal quality of each candidate charging base station further comprises:

determining a weight for the wireless charging configuration of the candidate charging base station according to a matching degree between a wireless charging configuration required by the terminal and the wireless charging configuration of the candidate charging base station.

8. A terminal, comprising:

a processor; and a memory configured to store a computer program;

wherein the processor is configured to:

receive capability information sent by a base station; and determine a wireless charging capability of the base station according to the capability information, wherein the processor is further configured to:

determine a target base station for cell selection or cell reselection among candidate base stations according to a wireless charging capability of each of the candidate base stations, wherein the target base station provides a wireless charging service for the terminal through multiple antennas of the target bases station, wherein the processor is further configured to:

determine candidate charging base stations supporting wireless charging among the candidate base stations, and determine a wireless charging configuration of each of the candidate charging base stations; and determine the target base station among the candidate charging base stations according to the wireless charging configuration and signal quality of each candidate charging base station.

9. The terminal according to claim 8, wherein the wireless charging capability comprises one of:

supporting wireless charging, or not supporting wireless charging;

and the processor is further configured to:

determine a wireless charging configuration of the base station according to the capability information in response to determining that the base station supports wireless charging.

10. The terminal according to claim 9, wherein the wireless charging configuration comprises at least one of:

a wireless charging power, a wireless charging duration, or a wireless charging frequency.

11. The terminal according to claim 8, wherein an electric quantity of the terminal being lower than an electric quantity threshold.

12. The terminal according to claim 8, wherein the processor is further configured to:

perform weighted summation on the wireless charging configuration and the signal quality of the candidate charging base station to obtain reference information; and determine the target base station among the candidate charging base stations according to reference information of each candidate charging base station, wherein the processor is further configured to:

determine a weight for the wireless charging configuration of the candidate charging base station according to a matching degree between a wireless charging configuration required by the terminal and the wireless charging configuration of the candidate charging base station.

13. A capability indication method, performed by a communication system comprising a terminal and a base station, the method comprising:

sending, by the base station, capability information to the terminal, wherein the capability information is configured to indicate a wireless charging capability of the base station, receiving, by the terminal, capability information sent by the base station; and determining, by the terminal, the wireless charging capability of the base station according to the capability information, wherein the method further comprises:

determining, by the terminal, a target base station for cell selection or cell reselection among candidate base stations according to a wireless charging capability of each of the candidate base stations, wherein the target base station provides a wireless charging service for the terminal through multiple antennas of the target bases station, wherein determining the target base station for cell selection or cell reselection among the candidate base stations according to the wireless charging capability of each of the candidate base stations comprises:

determining, by the terminal, candidate charging base stations supporting wireless charging among the candidate base stations, and determining a wireless charging configuration of each of the candidate charging base stations; and determining, by the terminal, the target base station among the candidate charging base stations according to the wireless charging configuration and signal quality of each candidate charging base station.

14. The method according to claim 13, wherein the wireless charging capability comprises one of:

supporting wireless charging, or not supporting wireless charging.

15. The method according to claim 14, further comprising:

determining, by the terminal, a wireless charging configuration of the base station according to the capability information in response to determining that the base station supports wireless charging.

16. The method according to claim 15, wherein the wireless charging configuration comprises at least one of:

a wireless charging power, a wireless charging duration, or a wireless charging frequency.

17. The method according to claim 13, wherein an electric quantity of the terminal being lower than an electric quantity threshold.

18. The method according to claim 13, wherein determining the target base station among the candidate charging base stations according to the wireless charging configuration and the signal quality of each candidate charging base station comprises:

performing, by the terminal, weighted summation on the wireless charging configuration and the signal quality of the candidate charging base station to obtain reference information; and determining, by the terminal, the target base station among the candidate charging base stations according to reference information of each candidate charging base station.

19. The method according to claim 18, wherein determining the target base station among the candidate charging base stations according to the wireless charging configuration and the signal quality of each candidate charging base station further comprises:

determining, by the terminal, a weight for the wireless charging configuration of the candidate charging base station according to a matching degree between a wireless charging configuration required by the terminal and the wireless charging configuration of the candidate charging base station.

20. A communication system, comprising a terminal and a base station, the system being configured to perform the method according to claim 13.

* * * * *